(12) United States Patent
Satran et al.

(10) Patent No.: US 7,104,736 B2
(45) Date of Patent: *Sep. 12, 2006

(54) TANGENTIAL CUTTING INSERT AND MILLING CUTTER

(75) Inventors: Amir Satran, Kfar Vradim (IL); Daniel Dagan, Nahariya (IL)

(73) Assignee: Iscar Ltd., Tefen (IL)

( * ) Notice: Subject to any disclaimer, the term of this patent is extended or adjusted under 35 U.S.C. 154(b) by 0 days.

This patent is subject to a terminal disclaimer.

(21) Appl. No.: 11/367,152

(22) Filed: Mar. 3, 2006

(65) Prior Publication Data

US 2006/0147279 A1  Jul. 6, 2006

Related U.S. Application Data

(63) Continuation of application No. 10/921,795, filed on Aug. 20, 2004, now Pat. No. 7,014,396, which is a continuation of application No. 10/454,078, filed on Jun. 4, 2003, now Pat. No. 6,872,034.

(30) Foreign Application Priority Data

Jun. 4, 2002 (IL) ....................... 150012
Dec. 4, 2002 (IL) ....................... 153252

(51) Int. Cl.
   *B23B 27/16* (2006.01)
(52) U.S. Cl. ..................... 407/113; 407/114
(58) Field of Classification Search ............. 407/40, 407/113, 114, 115, 116, 117
See application file for complete search history.

(56) References Cited

U.S. PATENT DOCUMENTS

| | | |
|---|---|---|
| 3,716,900 A | 2/1973 | Erkfritz |
| 4,789,273 A | 12/1988 | Wiacek et al. |
| 5,203,648 A | 4/1993 | Bohannan et al. |
| 5,333,972 A | 8/1994 | Bernadic et al. |
| 5,382,118 A | 1/1995 | Satran et al. |
| 5,383,750 A | 1/1995 | Satran et al. |
| 6,120,219 A | 9/2000 | Satran et al. |
| 6,142,716 A | 11/2000 | Jordberg et al. |
| 6,227,772 B1 | 5/2001 | Heinloth et al. |
| 6,238,146 B1 | 5/2001 | Satran et al. |
| 6,503,028 B1 | 1/2003 | Wallstrom |
| 6,872,034 B1 * | 3/2005 | Satran et al. ............. 407/113 |
| 7,014,396 B1 * | 3/2006 | Satran et al. ............. 407/113 |

FOREIGN PATENT DOCUMENTS

| | | |
|---|---|---|
| EP | 0 769 341 B1 | 4/1997 |
| WO | WO 96/35536 | 11/1996 |

\* cited by examiner

*Primary Examiner*—Willmon Fridie, Jr.
(74) *Attorney, Agent, or Firm*—Womble Carlyle (57) ABSTRACT

A tangential cutting insert having two identical opposing end surfaces with two identical opposing major side surfaces and two identical opposing minor side surfaces extending between them. Each end surface has a peripheral edge containing cutting edges and four corners of which two are lowered and two are raised. Each end surface is provided with at least one projecting abutment member having a projecting abutment surface, wherein in a side view of either major side surface, the at least one projecting abutment surface is concave.

14 Claims, 11 Drawing Sheets

TANGENTIAL CUTTING INSERT AND MILLING CUTTER

RELATED APPLICATIONS

This is a Continuation of U.S. patent application Ser. No. 10/921,795, filed Aug. 20, 2004, now U.S. Pat. No. 7,014,396, which is a Continuation of U.S. patent application Ser. No. 10/454,078, filed Jun. 4, 2003, now U.S. Pat. No. 6,872,034. The contents of the aforementioned applications are incorporated by reference in their entirety.

FIELD OF THE INVENTION

The present invention relates to a tangential indexable cutting insert and a milling cutter for use in metal cutting processes in general and for milling a square shoulder in a workpiece in particular.

BACKGROUND OF THE INVENTION

Tangential cutting inserts, also known as on-edge, or lay down, cutting inserts, are oriented in an insert holder in such a manner that during a cutting operation on a workpiece the cutting forces are directed along a major (thicker) dimension of the cutting insert. An advantage of such an arrangement being that the cutting insert can withstand greater cutting forces than when oriented in such a manner that the cutting forces are directed along a minor (thinner) dimension of the cutting insert.

There is disclosed in EP 0 769 341 a face milling cutter employing a double-sided indexable tangential cutting insert having a prismoidal shape with two opposed generally rectangular rake surfaces connected by side surfaces. The cutting insert has a basic "negative" geometry and therefore in order to provide the necessary clearance between the cutting insert and the workpiece, when mounted in a face-mill, the cutting insert is oriented with a negative axial rake angle. However, negative axial rake angles are disadvantageous, e.g., they have been found to be deficient in cutting efficiency for applications involving difficult to machine materials.

There is disclosed in WO 96/35536 a double-sided indexable tangential cutting insert which when mounted in a face-mill has a positive axial rake angle, even when the necessary clearance between the cutting insert and the workpiece is provided. This cutting inserts presents two peripheral cutting edges for a right-hand face mill and two peripheral cutting edges for a left-hand face mill.

A double-sided indexable tangential cutting insert for a boring tool head is disclosed in U.S. Pat. No. 5,333,972. The insert is provided at each end with a protruding flat island. Each long cutting edge is inclined at an angle of 3° relative to the protruding flat island, defining an "insert axial rake angle". Rearward of each cutting edge is a descending land surface that merges with an increasing incident angle surface to form a chip breaker groove. Each increasing incident angle surface extends from its associated descending land surface to an adjacent island, at either the top or the bottom of the cutting insert. The cutting insert is left or right handed. It is manufactured to be right-handed and, when flipped around, is left-handed. It will be appreciated that the magnitude of the insert axial rake angle is limited for practical reasons. Any increase in the insert axial rake angle will result in an increase in the "vertical" extent of the increasing incident angle surface (see FIG. 3 of U.S. Pat. No. 5,333,972) that will have an adverse effect on chip development and evacuation.

It is an object of the present invention to provide a double-sided indexable tangential cutting insert that substantially overcomes the above-mentioned problems.

It is a further object of the present invention to provide a double-sided indexable tangential cutting insert having four main cutting edges, for a given direction of rotation of the milling cutter, each main cutting edge having a positive axial rake angle when mounted as an operative cutting edge in a milling cutter.

It is yet a further object of the present invention to provide a double-sided indexable tangential cutting insert capable of milling a square shoulder in a workpiece.

SUMMARY OF THE INVENTION

In accordance with the present invention there is provided a cutting insert, for use in a milling cutter. The cutting insert includes:

two identical opposing end surfaces, each end surface having four corners including two lowered corners and two raised corners, the lowered corners being closer to a median plane M than the raised corners, each end surface being provided with at least one abutment surface;

a peripheral side surface extending between the two opposing end surfaces and comprising two identical opposing major side surfaces and two identical opposing minor side surfaces; and a peripheral edge formed at the intersection of each end surface and the peripheral side surface, each peripheral edge comprising two major edges and two minor edges;

wherein, in a side view of a major side surface, the major edges each slope between a corresponding raised corner and a corresponding lowered corner; and wherein, in a side view of a minor side surface, the minor edges each comprise one section that is sloped and another section that is straight, the two sections associated with each minor edge together extending between a corresponding raised corner and a corresponding lowered corner.

In a preferred embodiment, the two identical opposing end surfaces have 180° rotational symmetry about a first axis A1 passing therethrough, the two identical opposing major side surfaces have 180° rotational symmetry about a second axis A2 passing therethrough, the second axis A2 being perpendicular to the first axis A1, and a minor plane P1 is defined by the first axis A1 and the second axis A2; the two identical opposing minor side surfaces have 180° rotational symmetry about a third axis A3 passing therethrough, the third axis A3 being perpendicular to the first axis A1 and the second axis A2, and a major plane P2 is defined by the first axis A1 and the third axis A3; the median plane M is defined by the second axis A2 and the third axis A3; and the at least one abutment member comprises a projecting abutment surface.

Preferably, in a side view of either major side surface, the abutment surface is generally V-shaped.

In accordance with an embodiment of the present invention, in an end-view of the cutting insert, the abutment surface is generally rectangular in shape having two parallel long edges extending between two short edges, the long edges making an angle of β with the major plane P2.

In accordance with a specific application of the first embodiment, β=2°.

If desired, the abutment surface comprises three flat portions, two outer flat portions with an inner flat portion therebetween, each outer flat portion extending from a respective short edge to the inner flat portion.

In accordance with a first embodiment of the present invention, in an end-view of the cutting insert two median lines are defined, one for each outer flat portion, the median lines do not overlap and do not lie on a common straight line.

Preferably, the two median lines are parallel.

Further preferably, the two median lines are parallel to the major side surfaces.

In accordance with a second embodiment of the present invention, in an end view of the cutting insert the at least one abutment member has an elongated S-shape.

In accordance with a third embodiment of the present invention, each end surface is provided with two abutment members.

Preferably, the two abutment members are located on opposite sides of the minor plane P1.

Further preferably, a major portion of a first of the two abutment members is located on a first side of the major plane P2 and a major portion of a second of the two abutment members is located on a second side of the major plane P2.

If desired, each minor side surface is divided into two minor side sub-surfaces by the major plane along a join where the major plane intersects the minor side surface, each minor side sub-surface extending away from the join at an angle α with respect to a plane passing through the join and parallel to the minor plane P1.

In accordance with the present invention, each minor side surface merges with an adjacent major side surface at a corner side surface, wherein each corner side surface extends between a given raised corner of one of the two opposing end surfaces and a given lowered corner of the other of one of the two opposing end surfaces.

In accordance with the present invention, each cutting edge comprises a major cutting edge, a minor cutting edge and a corner cutting edge, therebetween.

In accordance with the present invention, major, corner, and minor edges are formed at the intersection of the major, corner and minor side surfaces, respectively with an adjacent end surface.

In accordance with the present invention, each corner cutting edge is associated with a given raised corner.

Generally, each major cutting edge extends along substantially the whole length of an associated major edge.

Generally, each minor cutting edge extends along at least half of the length of an associated minor edge.

In accordance with the present invention, the cutting insert further comprises an insert through bore extending between the major side surfaces and having a bore axis B coinciding with the second axis A2.

Generally, a first major dimension D1, measured between the end surfaces, is greater than a minor dimension D2 measured between the major side surfaces.

Further generally, a second major dimension D3, measured between the minor side surfaces, is greater than the minor dimension D2.

There is also provided in accordance with the present invention, a milling cutter including at least one cutting insert as described above, and a cutter body having at least one insert pocket in which the at least one cutting insert is retained, the at least one insert pocket comprising adjacent side and rear walls generally transverse to a base, the rear wall being generally convex; the side wall being provided with an axial location surface that abuts a given minor side surface of the at least one cutting insert at a given axial abutment region; the rear wall being provided with two tangential location surfaces, located on either side of a central region of the rear wall, a first of the two tangential location surfaces abuts a first tangential abutment surface located on the at least one cutting insert, a second of the two tangential location surfaces abuts a second tangential abutment surface located on the at least one cutting insert.

In accordance with the present invention, the given axial abutment region is located on a forward region of a radially outer minor side sub-surface, the forward region being distal the rear wall of the insert pocket.

Further in accordance with the present invention, the lower and upper tangential abutment surfaces are located on opposite sides of the minor plane P1.

In accordance with the first and second embodiments, each end surface of the at least one cutting insert is provided with one abutment member and the first and second tangential abutment surfaces are located on the one abutment member.

In accordance with the third embodiment, each end surface of the at least one cutting insert is provided with two abutment member and the first tangential abutment surface is located on one of the two abutment members, and the second tangential abutment surfaces is located on the other one of the abutment member.

In another aspect, the present invention is directed to a tangential cutting insert comprising two identical opposing end surfaces, each end surface having four corners including two lowered corners and two raised corners, the lowered corners being closer to a median plane M than the raised corners, each end surface being provided with two abutment members separated by a central recessed region, each abutment member having an abutment surface. The insert also has a peripheral side surface extending between the two opposing end surfaces and comprising two identical opposing major side surfaces and two identical opposing minor side surfaces. A peripheral edge is formed at the intersection of each end surface and the peripheral side surface, at least two sections of each peripheral edge constituting cutting edges. In a side view of either major side surface, the abutment surfaces of each abutment member of a given end surface lie on a concave surface.

BRIEF DESCRIPTION OF THE DRAWINGS

For a better understanding, the invention will now be described, by way of example only, with reference to the accompanying drawings in which.

DETAILED DESCRIPTION OF THE INVENTION

Attention is first drawn to FIGS. 1 to 6C, showing a cutting insert 10 in accordance with a first embodiment of the present invention. The cutting insert 10 is tangential and indexable. The cutting insert 10 is typically manufactured by form-pressing and sintering carbide powders. The cutting insert 10 is generally rectangular in an end view and has two identical opposing end surfaces 12. Each end surface 12 has 180° rotational symmetry about a first axis A1 passing through the two end surfaces 12.

Figure 1:
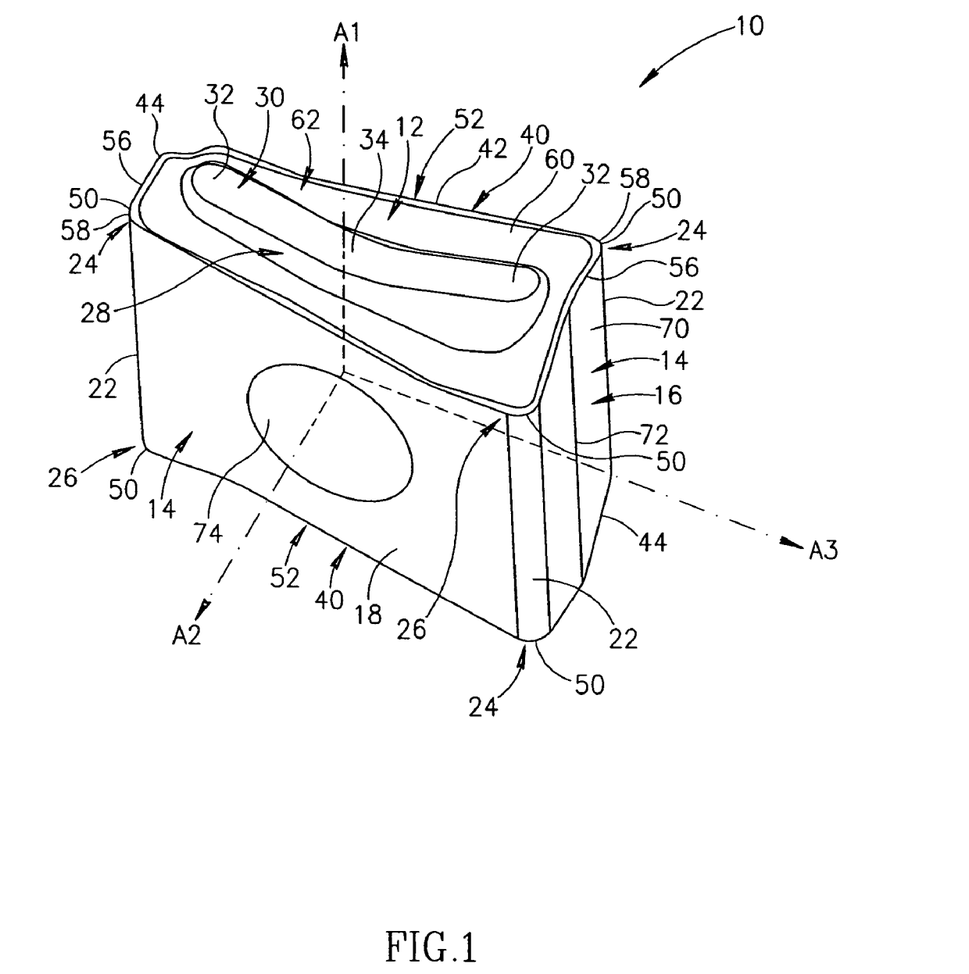
FIG. 1 is a perspective view of a cutting insert in accordance with a first embodiment of the present invention.
Figure 2:
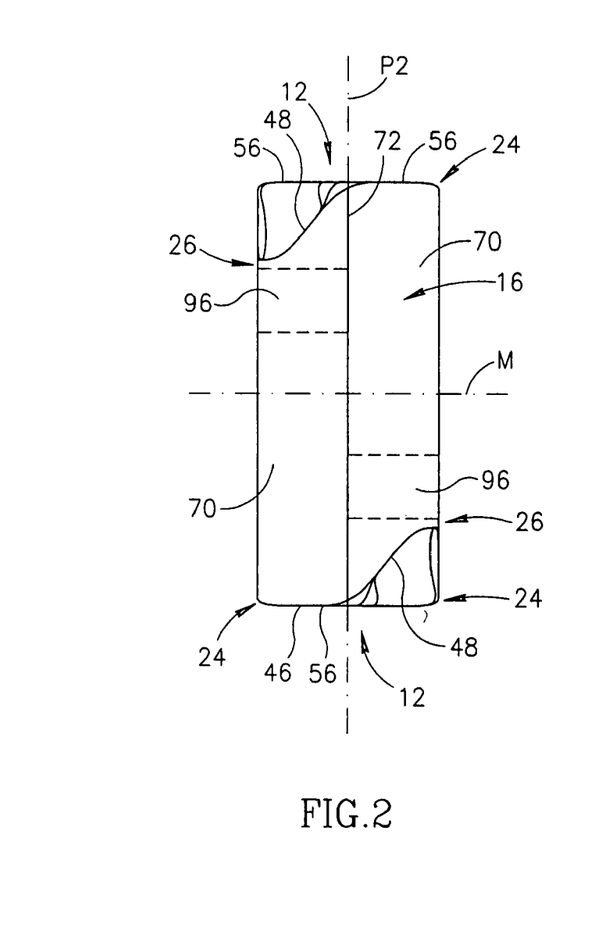
FIG. 2 is a first side view of the cutting insert in FIG. 1.
Figure 3:
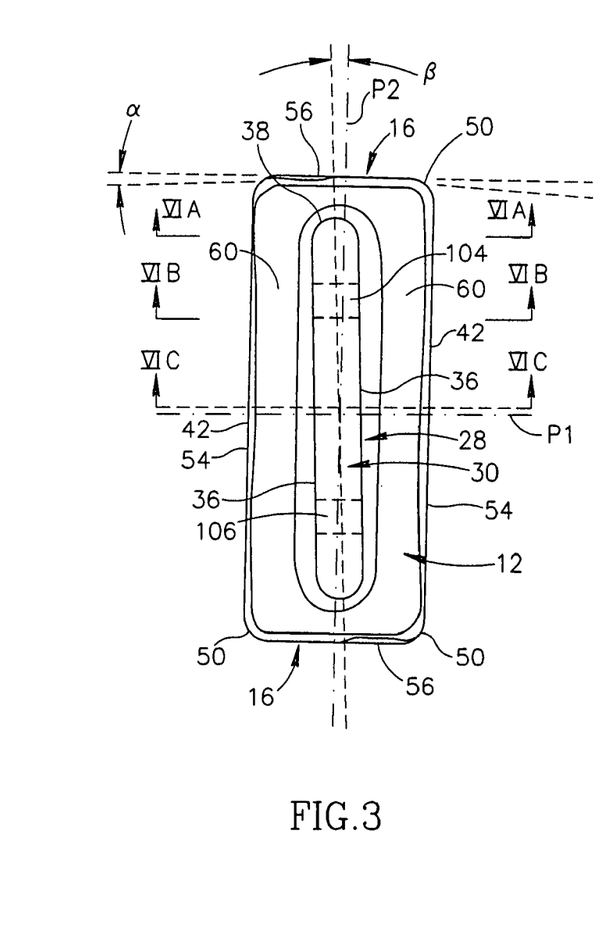
FIG. 3 is an end view of the cutting insert shown in FIG. 1.

A peripheral side surface 14 extends between the two opposing end surfaces 12 and comprises two opposed identical minor side surfaces 16, two opposed identical major side surfaces 18, and four opposed corner side surfaces 22. Adjacent minor and major side surfaces 16, 18 merge at a common corner side surface 22. The two identical opposing major side surfaces 18 each have 180° rotational symmetry about a second axis A2 passing through the opposing major side surfaces 18. The second axis A2 is perpendicular to the first axis A1. Similarly, the two identical opposing minor side surfaces 16 each have 180° rotational symmetry about a third axis A3 passing through the opposing minor side surfaces 16. The third axis A3 is perpendicular to the first axis A1 and to the second axis A2. A minor plane P1 defined by the first axis A1 and the second axis A2, a major plane P2 defined by the first axis A1 and the third axis A3 and a median plane M is defined by the second axis A2 and the third axis A3.

Figure 4:
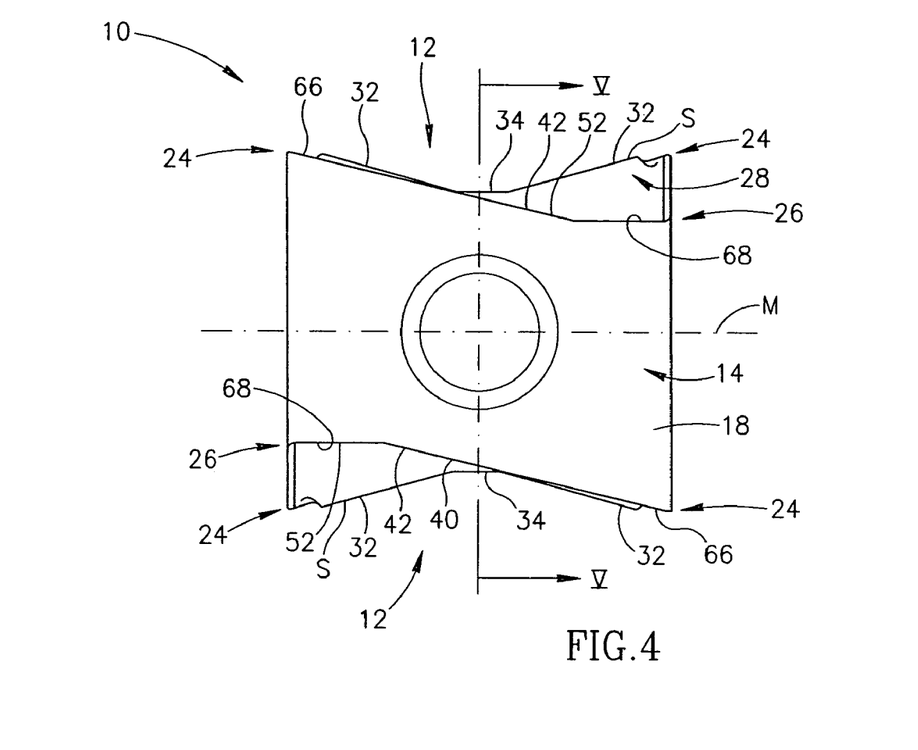
FIG. 4 is a second side view of the cutting insert shown in FIG. 1.
Figure 5:
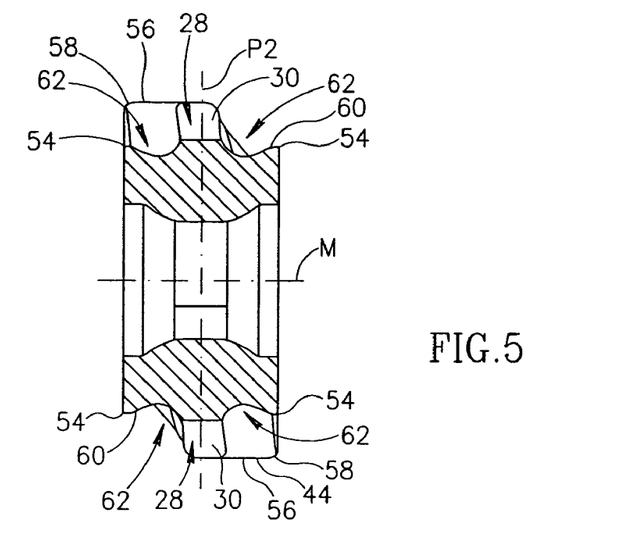
FIG. 5 is a cross-sectional view of the cutting insert shown in FIG. 1 taken along the line V—V in FIG. 4.
Figure 6A:
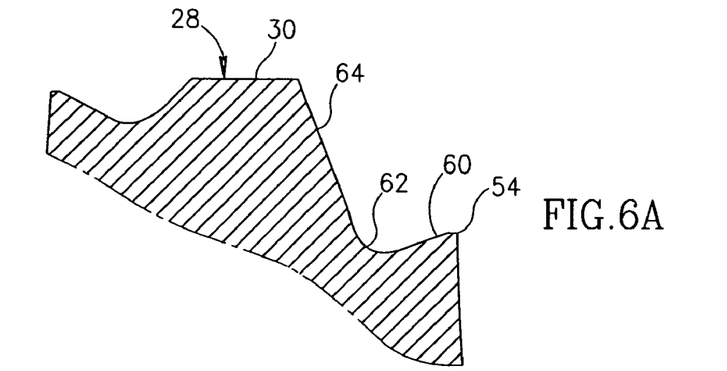
FIG. 6A is an enlarged scale partial cross section of the cutting insert shown in FIG. 1 taken along the line VIA—VIA in FIG. 3.
Figure 6B:
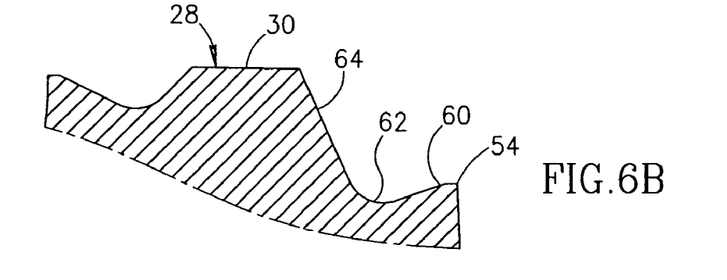
FIG. 6B is an enlarged scale partial cross section of the cutting insert shown in FIG. 1 taken along the line VIB—VIB in FIG. 3.
Figure 6C:
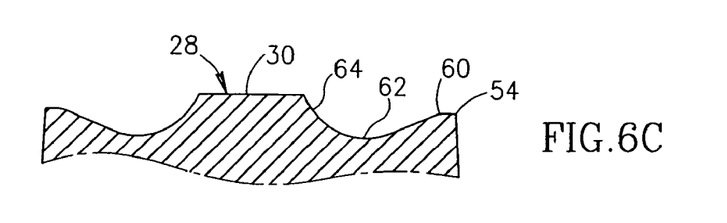
FIG. 6C is an enlarged scale partial cross section of the cutting insert shown in FIG. 1 taken along the line VIC—VIC in FIG. 3.

Each end surface 12 has four corners, two lowered corners 26 and two raised corners 24. The lowered corners 26 being closer to the median plane M than the raised corners 24. Each corner side surface 22 extends between a given raised corner 24 of one of the two opposing end surfaces 12 and a given lowered corner 26 of the other of one of the two opposing end surfaces 12. Each end surface 12 is provided with a projecting abutment member 28 having a projecting abutment surface 30, wherein in a side view of either major side surface 18, the projecting abutment member 28 is generally concave in form. The projecting abutment surface 30 comprises three generally flat portions, two outer portions 32 with an inner portion 34 therebetween. Therefore, in a side view of either major side surface 18, each projecting abutment surface 30 lies on a concave surface S which is generally V-shaped in form.

Referring to FIG. 3, it can be seen that in an end-view of the cutting insert 10 the projecting abutment surface 30 is generally rectangular in shape having two parallel long edges 36 extending between two short edges 38. Therefore, each outer flat portion 32 of the projecting abutment surface 30, extends from a respective short edge 38 to the inner flat portion 34.

A peripheral edge 40 is formed at the intersection of each end surface 12 and the peripheral side surface 14. For each end surface 12, the peripheral edge 40 comprises two major edges 42, formed by the intersection of the major side surfaces 18 with the end surface 12; two minor edges 44, formed by the intersection of the minor side surfaces 16 with the end surface 12; and two corner edges 42, formed by the intersection of the corner side surfaces 22 with the end surface 12.

At least two sections of each peripheral edge 40 the cutting insert 10 constitute cutting edges 52. Each cutting edge 52 comprises a major cutting edge 54, extending along substantially the whole length of its associated major edge 42; a minor cutting edge 56, extending along at least half of the length of its associated minor edge 44; and a corner cutting edge 58, associated with a raised corner 24 and at which the major and minor cutting edges 54, 56 merge. Adjacent each cutting edge 52 in the end surfaces 12 is a rake surface 60 along which chips, removed from a workpiece during a milling operation, flow. Between the rake surface 60 and the projecting abutment member 28 there is a chip groove 62. The portion of the projecting abutment member 28 adjacent the chip forming groove 62 constitutes a chip deflector 64.

Referring to FIG. 3, it is seen that each minor side surface 16 is divided into two minor side sub-surfaces 70 by a join 72 where the major plane P2 intersects the minor side surface 16. Each minor side sub-surface 70 extends away from the join 72 at an angle α with respect to a plane P3 passing through the join 72 and parallel to the minor plane P1. In accordance with a specific application this angle is approximately 1.5°. The cutting insert is provided with a through bore 74 extending between the major side surfaces 18 and having a bore axis B coinciding with the second axis A2.

As will become apparent below, with reference to the milling cutter in accordance with the present invention, the section of the major cutting edge 54 adjacent the raised corner 24 constitutes a leading end 66 of the major cutting edge 54 whereas, the section of the major cutting edge 54 adjacent the lowered corner 26 constitutes a trailing end 68 of the major cutting edge 54. As can be seen in FIG. 4, in a side view of the cutting insert 10, the projecting abutment member 28 in the region of the leading end of the major cutting edge 54 and up to and a little beyond the region of the minor plane P1, does not protrude by much above the major cutting edge 54. As a consequence, chips in this region are completely formed during a milling process. However, in the region of the trailing end 68 of the major cutting edge 54, the chip deflector 64 protrudes much further than it does in the region of the leading end 66, which can disturb the development of the chips. In order to reduce the influence of the protruding chip deflector 64 in the region of the trailing end 68, the chip deflector 64 is designed to be more distant from the major cutting edge 54 in the region of the trailing end 68 than it is in the region of the leading end 66. Consequently, as can be seen in FIG. 3, in an end-view of the cutting insert 10 in accordance with the first embodiment of the present invention the long edges 36 of the projecting abutment member 28 are oriented at a small angle β with respect to the major plane P2. In accordance with a specific application this angle is 2°. Although the shape of the major cutting edge 54 is shown in FIG. 4 to be generally straight in a side view, apart from section adjacent the trailing end 68, the major cutting edge 54 can have any desired shape. Further with reference to FIG. 4, it can be seen that in a side view of the major side surface 18, the major cutting edge 54 generally slopes downwardly from the raised corner 24 to the lowered corner 26. With reference to FIG. 2, it can be seen that in a side view of the minor side surface 16, the minor edge 44 is clearly divided into two sections, a first section 46 extending from the raised corner 24 to approximately the major plane P2 and a second section 48 extending from the major plane to the lowered corner 26. The first section 46 is approximately straight and is perpendicular to the major side surface 18 in a side view, see FIG. 2, and is oriented at the angle α with respect to a plane P3 in an end view, see FIG. 3. The second section 48 extends from approximately the major plane P2 slopingly towards the lowered corner 26 in an end view, see FIG. 2, and is oriented at the angle α with respect to a plane P3 in an end view, see FIG. 3. It is the first section 46 of the minor edge 44 that forms the minor cutting edge 56.

Figure 7:
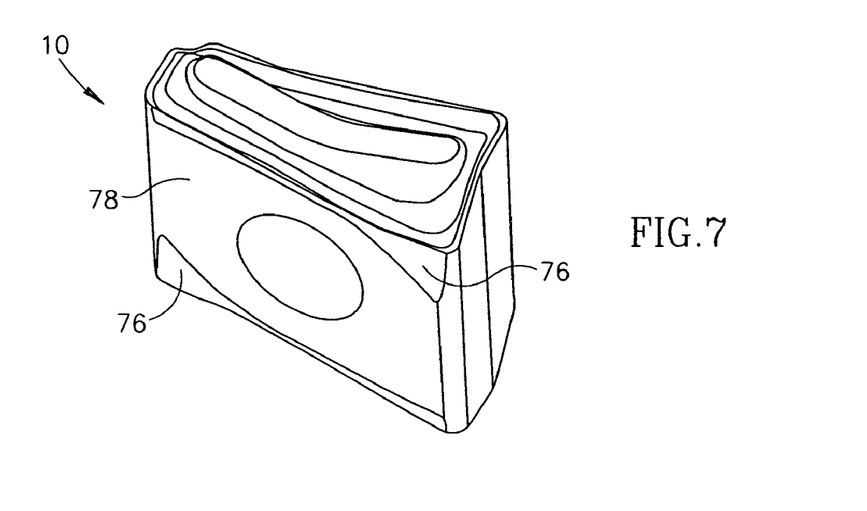
FIG. 7 is a perspective view of the cutting insert in accordance with the present invention with a ground primary relief surface.

Attention is now drawn to FIG. 7, showing the cutting insert 10 in accordance with the present invention, in which the major side surface comprises a primary relief surface 76 adjacent the major cutting edge 54 and a secondary relief surface 78 adjacent the primary relief surface 76. This arrangement gives more flexibility in the design of the major cutting edge 54 and is particularly important when designing the major cutting edge 54 to mill a true 90° shoulder in a workpiece. The primary relief surface 76 can have a constant relief angle along the major cutting edge 54, or a variable relief angle along the major cutting edge 54.

Figure 8:
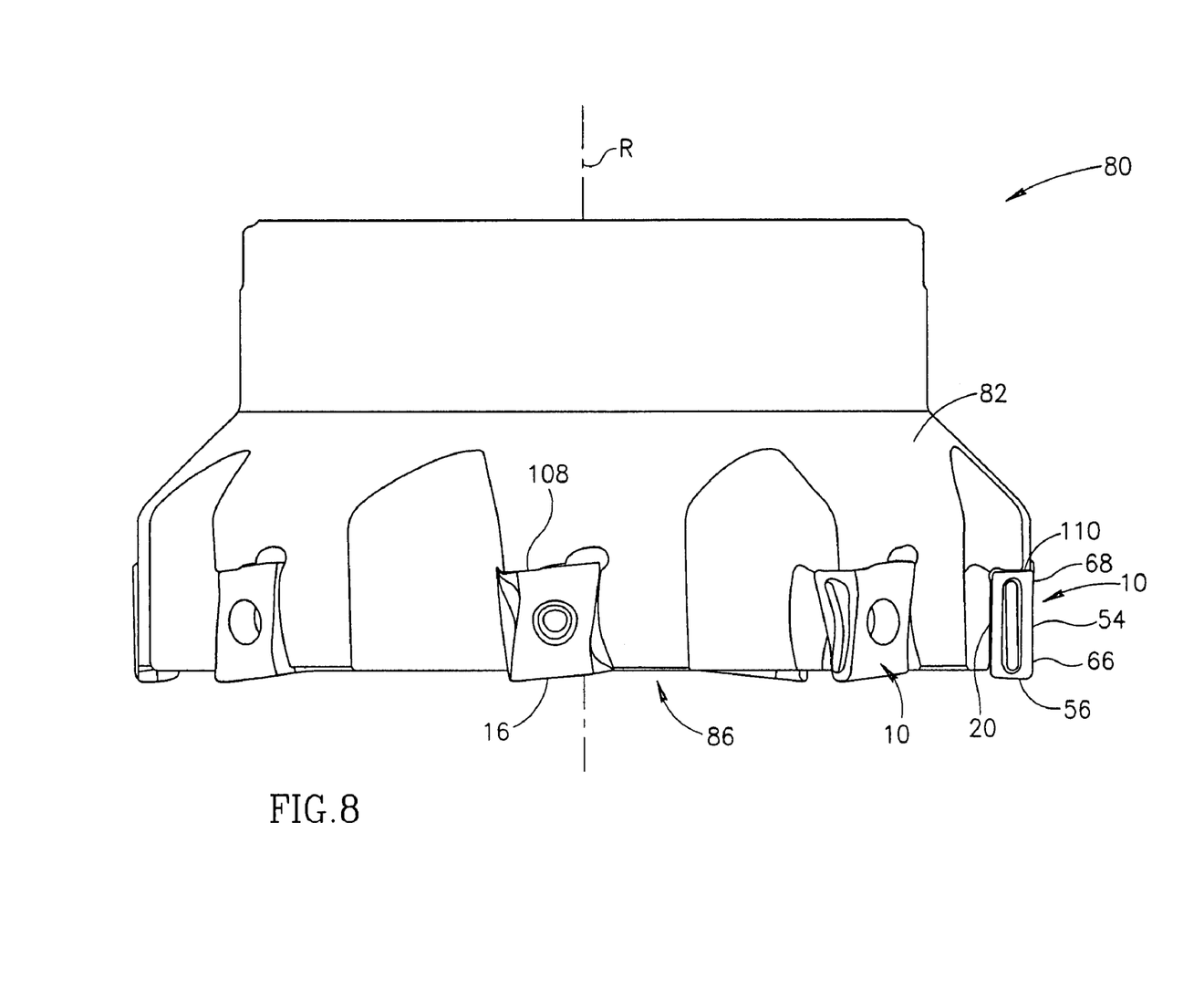
FIG. 8 is a perspective view of a milling cutter in accordance with the present invention.
Figure 9:
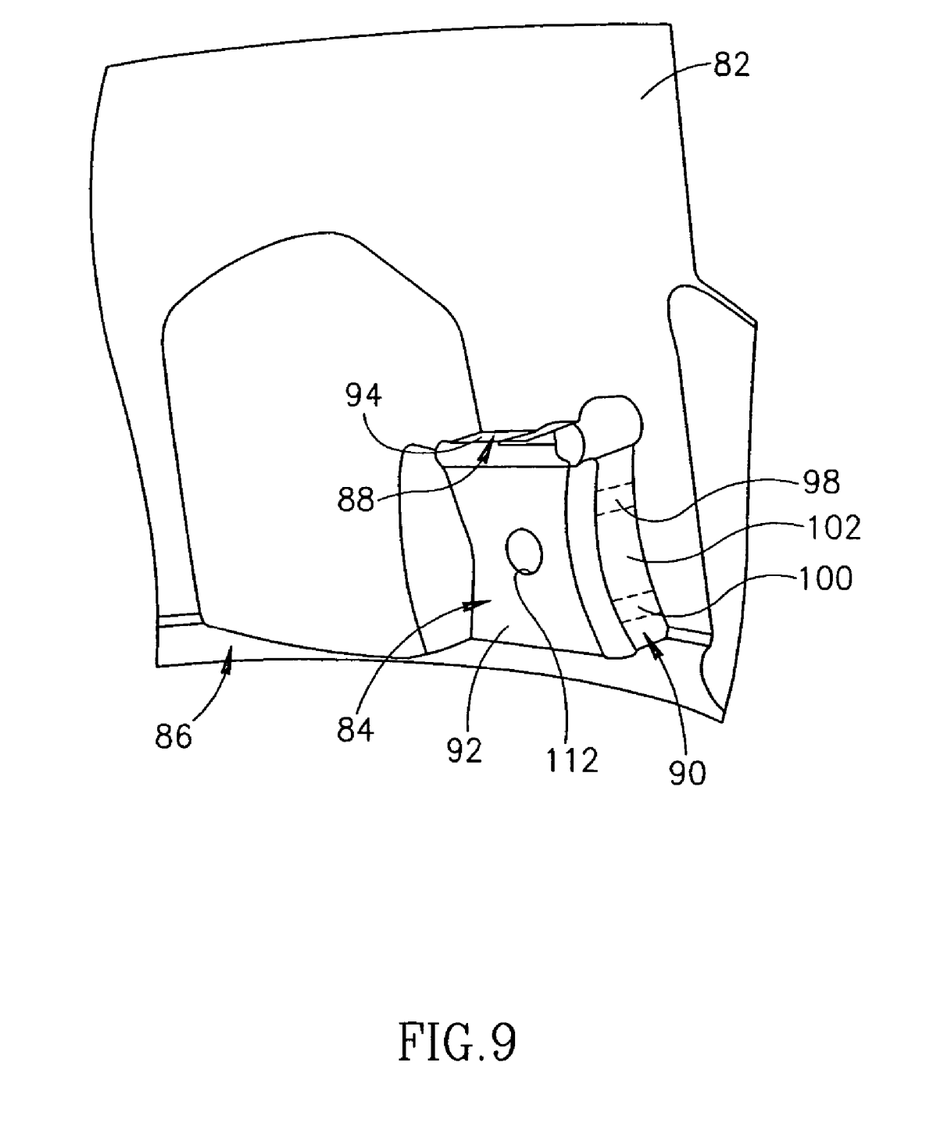
FIG. 9 is a perspective view of a portion of the cutter body of the milling cutter in accordance with the present invention, showing in detail an insert pocket.

Attention is now drawn to FIG. 8, showing a milling cutter 80 with an axis of rotation R, having a cutter body 82 provided with a plurality of insert pockets 84. In each insert pocket 84 a cutting insert 10 in accordance with the present invention is clamped by means of a clamping screw (not shown). The axial rake angle will generally be in the range of 5° to 20°. As can be seen, each cutting insert is seated so that there will be a clearance between a workpiece (not shown) and the cutting insert's minor side surface 16 adjacent the milling cutter's face 86. The structure of the insert pocket 84 is shown in detail in FIG. 9. The insert pocket 84 comprises adjacent side and rear walls 88, 90 generally transverse to a base 92. The rear wall 90 is generally convex and the side wall 88 is provided with an axial location surface 94 for abutting a given minor side surface 16 of the cutting insert 10 at an axial abutment region 96. The rear wall 90 is provided with two tangential location surfaces, a upper tangential location surface 98, adjacent the pocket side wall 88 and a lower tangential location surface 100 adjacent the milling cutter's face 86. The two tangential location surfaces 98, 100 project outwardly from the rear wall 90 and are located on either side of a central region 102 of the rear wall 90, which is correspondingly recessed relative to the tangential location surfaces 98, 100. The upper tangential location surface 98 abuts an upper tangential abutment surface 104 located on the projecting abutment surface 30 of the cutting insert 10. The lower tangential location surface 100 abuts a lower tangential abutment surface 106 located on the projecting abutment surface 30. Clearly, the terms "lower" and "upper" used here with respect to the projecting abutment surface 30 are used only when the cutting insert 10 is mounted in the milling cutter 80, and with respect to the orientation shown in FIGS. 8 and 9. Similarly, with respect to FIGS. 8 and 9, the axial abutment region 96 is located on a forward region 108 of a radially outer minor side sub-surface 110, the forward region being distal the rear wall of the insert pocket 90. As can be seen in FIG. 3, the two tangential abutment surfaces 104, 106 on each projecting abutment surface 30 are located on opposite sides of the minor plane. As can be seen in FIG. 2, each minor side sub-surface 70 is provided with one axial abutment region 96 adjacent a lowered corner 26. The base 92 of the insert pocket 84 is provided with a threaded bore 112 for receiving a clamping screw in order to secure the cutting insert 10 in the insert pocket 84. When the cutting insert 10 is secured in the insert pocket 84, a radially inner major side surface 20 will abut the base 92 of the insert pocket 84. Preferably, the major side surfaces 18 of the cutting insert 10 are ground. Further preferably, the minor side sub-surfaces 70 are ground. With these surfaces ground, good positioning of the cutting insert 10 in the insert pocket 84 is ensured.

Figure 10:
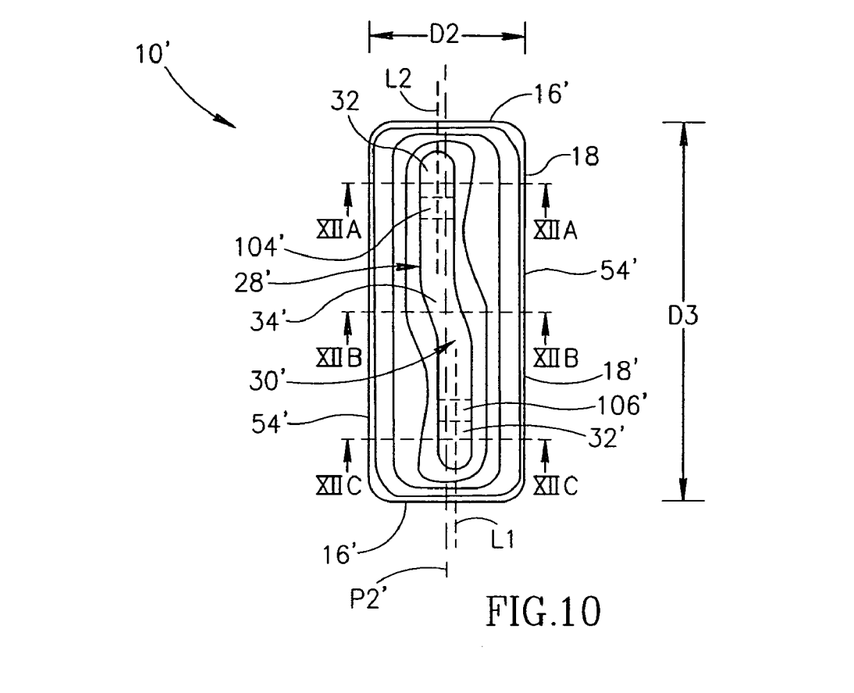
FIG. 10 is an end view of a cutting insert in accordance with a second embodiment of the present invention.
Figure 11:
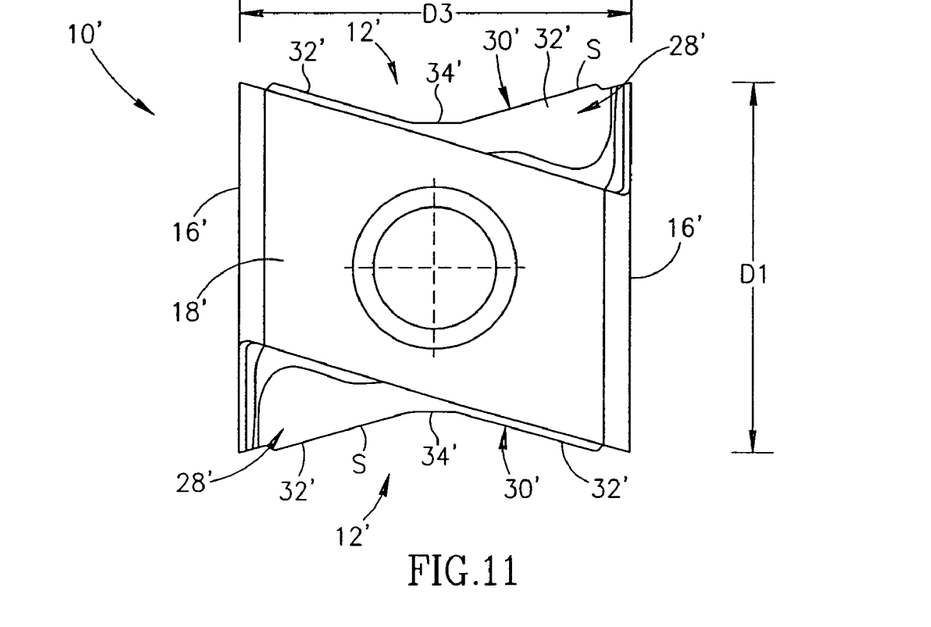
FIG. 11 is a side view of a cutting insert in accordance with the second embodiment of the present invention.
Figure 12A:
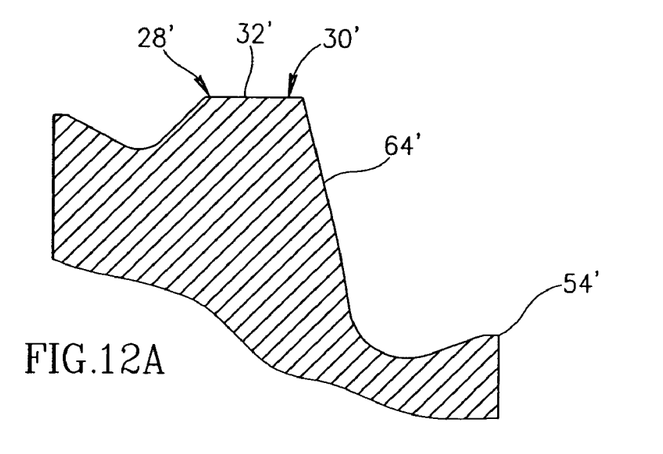
FIG. 12A is an enlarged scale partial cross section of the cutting insert in accordance with the second embodiment taken along the line XIIA—XIIA in FIG. 10.
Figure 12B:
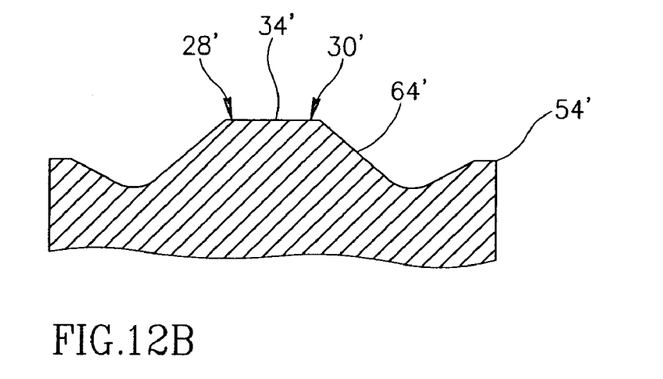
FIG. 12B is an enlarged scale partial cross section of the cutting insert in accordance with the second embodiment taken along the line XIIB—XIIB in FIG. 10.
Figure 12C:
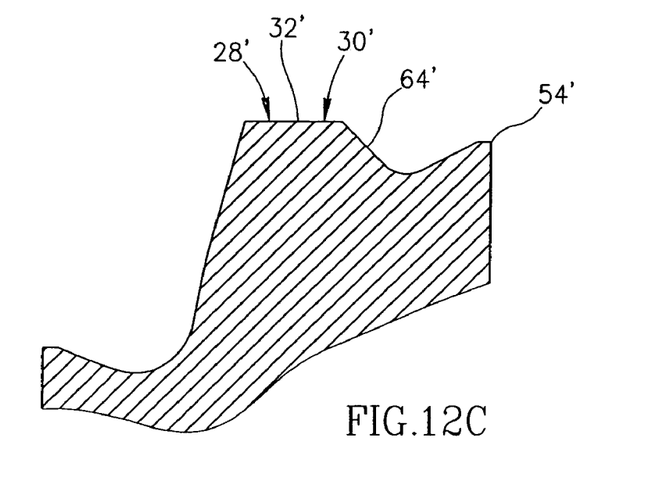
FIG. 12C is an enlarged scale partial cross section of the cutting insert in accordance with the second embodiment taken along the line XIIB—XIIB in FIG. 10.
Figure 13:
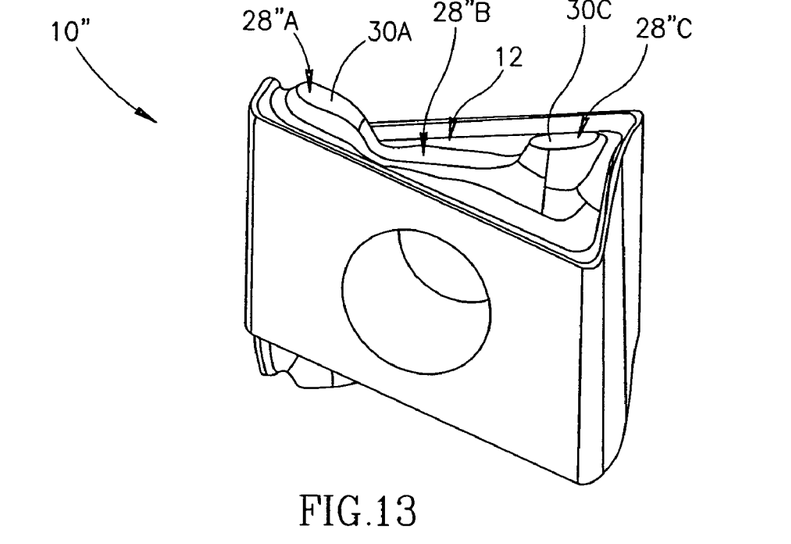
FIG. 13 is a perspective view of a cutting insert in accordance with a third embodiment of the present invention.
Figure 14:
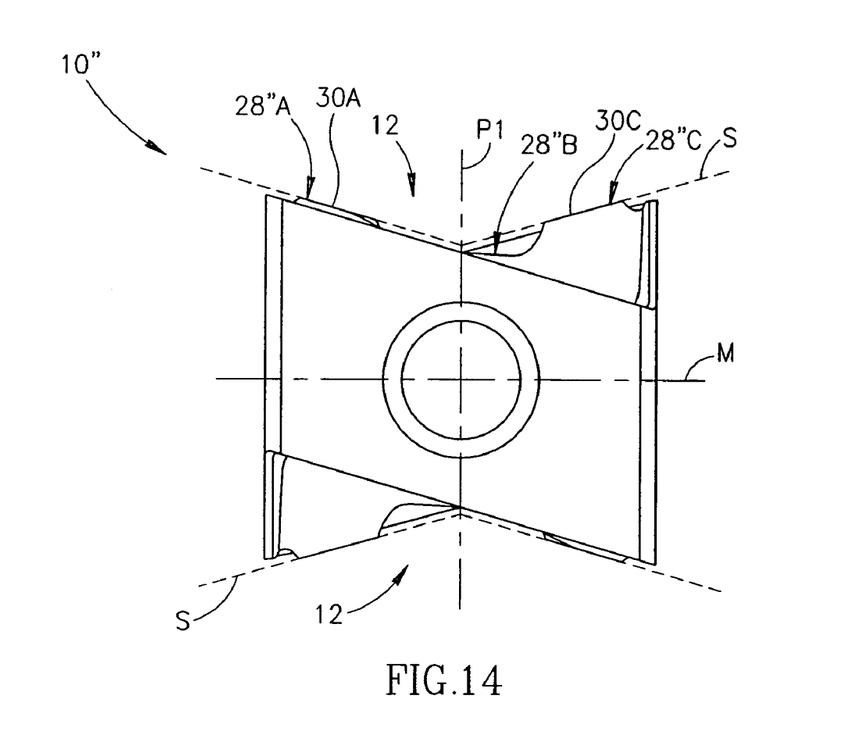
FIG. 14 is a side view of the cutting insert shown in FIG. 13.

Attention is now directed to FIGS. 10 to 12C showing a cutting insert 10' in accordance with a second embodiment of the present invention. The cutting insert 10' in accordance with the second embodiment is almost identical to the cutting insert 10 in accordance with the first embodiment. The main difference between the two cutting inserts is in the shape of the projecting abutment member 28, 28'. As can be seen from comparing FIGS. 4 and 11, in both embodiments the projecting abutment members 28, 28' are concave in shape in a side view of the cutting insert 10, 10', that is, each projecting abutment surface 30, 30' lies on a concave surface S which is generally V-shaped in form in a side view of the cutting insert 10, 10'. The difference between the two projecting abutment members 28, 28' being in their shape in an end view. Like the projecting abutment member 28 of the cutting insert 10 in accordance with the first embodiment, the projecting abutment member 28' of the cutting insert 10' in accordance with the second embodiment has a projecting abutment surface 30' comprising three generally flat portions, two outer flat portions 32' with an inner flat portion 34' therebetween. However, unlike the cutting insert 10 in accordance with the first embodiment, the shape of the projecting abutment member 28' in an end view of the cutting insert 10' in accordance with the second embodiment is not straight. As can be seen in FIG. 10, in an end view of the cutting insert 10' each of the two outer flat portions 32' has a median line L1, L2 that is parallel to, but offset from, the major plane P2'. One median line L1 being offset to one side of the major plane P2' and the other median line L2 being offset to the other side of the major plane P2', with the inner flat portion 34' being transverse to the major plane P2'. Clearly then, in an end view of the cutting insert 10', the median lines L1, L2 of the two flat outer portions 32' are parallel, non-adjacent, and spaced apart from each other. In other words, the median lines L1, L2 of the two flat outer portions 32' are parallel, do not overlap and do not lie on a common straight line. As a consequence of this structure, the distance between the chip deflector 64' and the adjacent major cutting edge 54' remains constant along each outer flat portion 32'. This is advantageous in regions where the chip deflector 64' is high above the adjacent major cutting edge 54' as shown on the right hand side in FIG. 12A.

As already stated, the cutting inserts 10, 10' in accordance with the first and second embodiments are almost identical. In particular, being tangential inserts each cutting insert 10, 10' has a first major dimension D1, measured between the end surfaces 12, 12' that is greater than a minor dimension D2 measured between the major side surfaces 18, 18'. A second major dimension D3, measured between the minor surfaces 16, 16' is also greater than the minor dimension D2.

The cutting insert 10' in accordance with the second embodiment is clamped in the milling cutter 80 in a similar way to which the cutting insert 10 in accordance with the first embodiment is clamped in the milling cutter 80. That is, the upper tangential location surface 98 of the insert pocket 84 abuts an upper tangential abutment surface 104' located on the projecting abutment surface 30' of the cutting insert 10' and the lower tangential location surface 100 of the insert pocket 84 abuts a lower tangential abutment surface 106' located on the projecting abutment surface 30'. In both the first and second embodiments the upper tangential abutment surface 104, 104' and the lower tangential abutment surface 106, 106' are generally flush with the projecting abutment surface 30, 30'.

As can be seen in FIG. 10, in an end view of the cutting insert 10' in accordance with the second embodiment, the projecting abutment member 28' has an elongated, or stretched out, "S-shape". However, as described above, the cutting insert 10' in accordance with the second embodiment is clamped in the milling cutter 80 in a similar way to which the cutting insert 10 in accordance with the first embodiment is clamped in the milling cutter 80. Clearly, other variations in the shape of the projecting abutment member 28 are acceptable in accordance with the present invention, provided that in a side view, as in FIGS. 4 and 11, the projecting abutment members 28, 28' are concave. This, is due to fact that the projecting abutment members 28, 28' are designed to reduce the disturbance caused to the development of the chips during a milling operation, and the rear wall 90 of the insert pocket 84 is designed correspondingly convex with two protruding abutment members 104, 106, 104', 106' in order to support the concave projecting abutment surface 30, 30'.

Attention is now directed to FIGS. 13 to 16C showing a cutting insert 10" in accordance with a third embodiment of the present invention. The cutting insert 10" in accordance with the third embodiment is almost identical to the cutting inserts 10, 10" in accordance with the first and second embodiments. The difference between the cutting insert 10" in accordance with the third embodiment and the cutting inserts 10, 10' in accordance with the first and second embodiments is in the structure of the projecting abutment member. In accordance with the third embodiment, each end surface 12" of the cutting insert 10" is provided with two projecting abutment members 28"A, 28"C separated by a central recessed region 28"B. Each projecting abutment member 28"A, 28"C has a projecting abutment surface 30A, 30C, wherein in a side view of either major side surface 18" of the cutting insert 10" the projecting abutment surfaces 30A, 30C at each end surface 12" lie on a concave surface S which is generally V-shaped in form.

Figure 15:
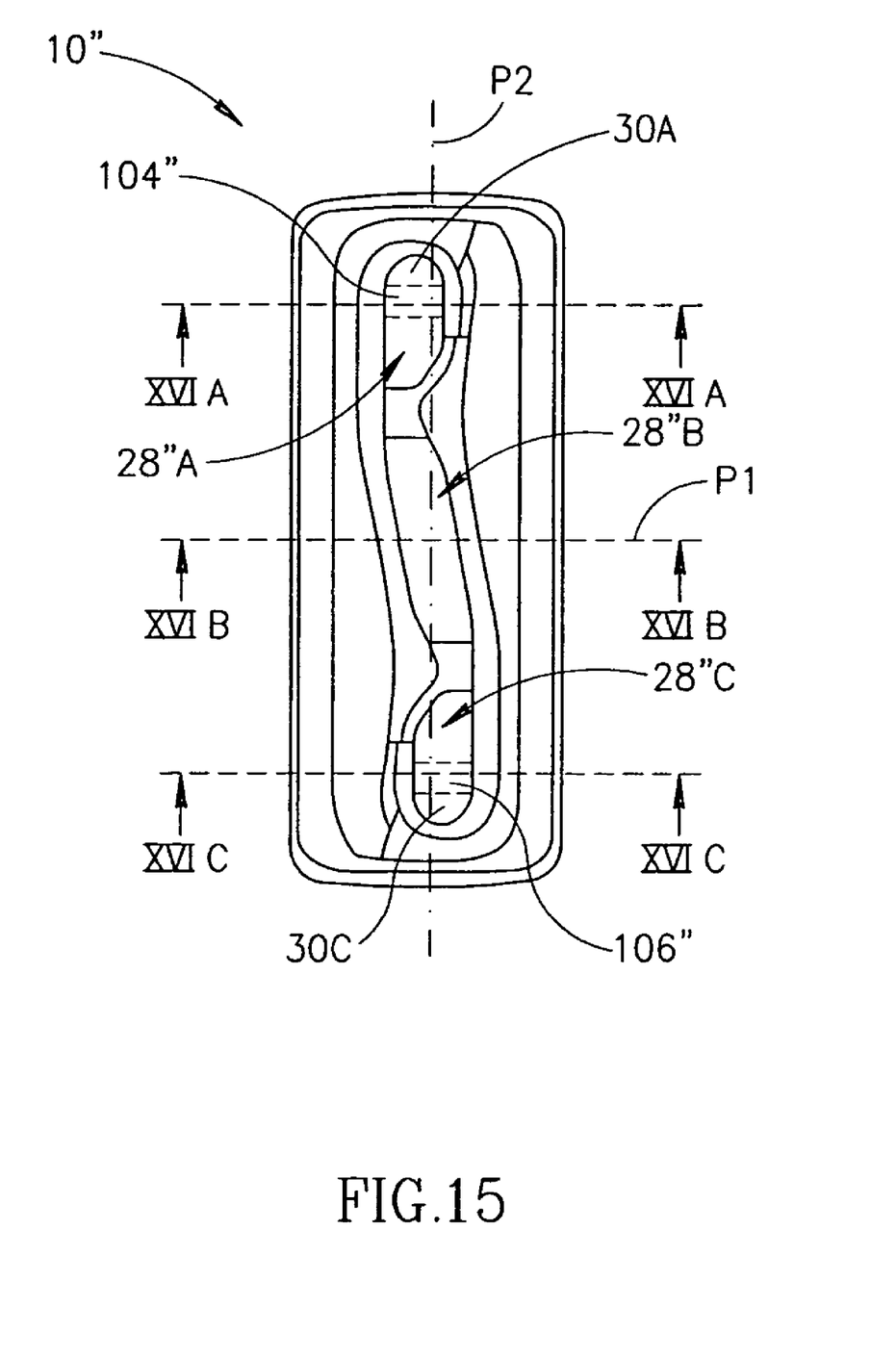
FIG. 15 is an end view of the cutting insert shown in FIG. 13.
Figure 16A:
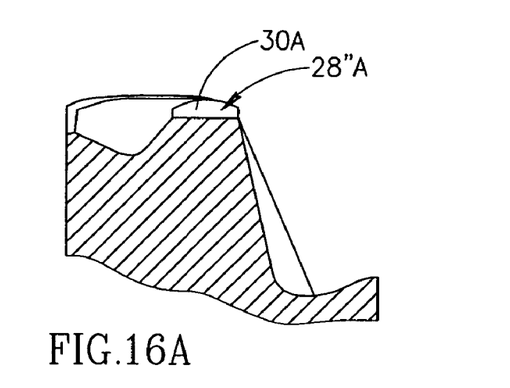
FIG. 16A is an enlarged scale partial cross section of the cutting insert shown in FIG. 13 taken along the line XVIA—XVIA in FIG. 15.
Figure 16B:
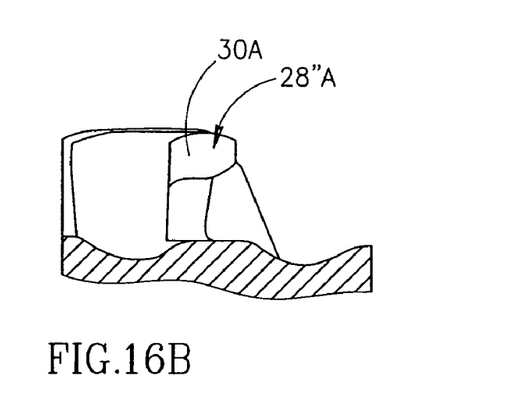
FIG. 16B is an enlarged scale partial cross section of the cutting insert shown in FIG. 13 taken along the line XVIB—XVIB in FIG. 15.
Figure 16C:
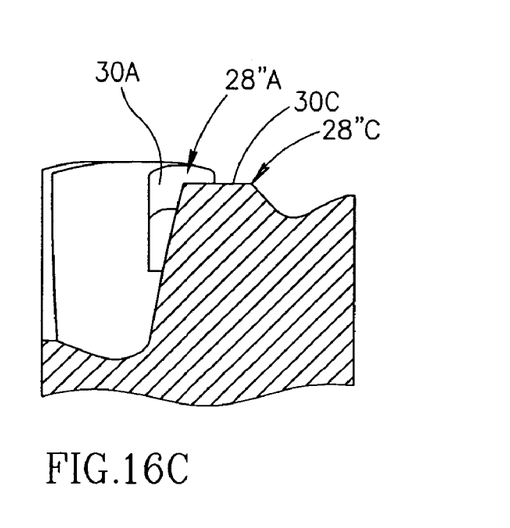
FIG. 16C is an enlarged scale partial cross section of the cutting insert shown in FIG. 13 taken along the line XVIC—XVIC in FIG. 15.

The two projecting abutment members 28"A, 28"C are located on opposite sides of the minor plane P1 of the cutting insert 10". As seen in FIG. 15, a major portion of one of the projecting abutment members 28"A is located on one side of the major plane P2 of the cutting insert 10", whereas a major portion of the other one of the projecting abutment members 28"C is located on the other side of the major plane P2.

The cutting insert 10" in accordance with the third embodiment is clamped in the milling cutter 80 in a similar way to which the cutting inserts 10, 10' in accordance with the first and second embodiments are clamped in the milling cutter 80. That is, the upper tangential location surface 98 of the insert pocket 84 abuts an upper tangential abutment surface 104" located on one of the projecting abutment surfaces 30A of the cutting insert 10" and the lower tangential location surface 100 of the insert pocket 84 abuts a lower tangential abutment surface 106" located on the other one of the projecting abutment surfaces 30C. The upper and lower tangential abutment surfaces 104", 106" are generally flush with their respective projecting abutment surfaces 30A, 30C.

Although the present invention has been described to a certain degree of particularity, it should be understood that various alterations and modifications could be made without departing from the scope of the invention as hereinafter claimed.

What is claimed is:

1. A cutting insert comprising:
   two identical opposing end surfaces, each end surface having four corners including two lowered corners and two raised corners, the lowered corners being closer to a median plane M than the raised corners, each end surface being provided with at least one abutment surface;
   a peripheral side surface extending between the two opposing end surfaces and comprising two identical opposing major side surfaces and two identical opposing minor side surfaces; and
   a peripheral edge formed at the intersection of each end surface and the peripheral side surface, each peripheral edge comprising two major edges and two minor edges;
   wherein, in a side view of a major side surface, the major edges each slope between a corresponding raised corner and a corresponding lowered corner; and
   wherein, in a side view of a minor side surface, the minor edges each comprise one section that is sloped and another section that is straight, the two sections associated with each minor edge together extending between a corresponding raised corner and a corresponding lowered corner.

2. The cutting insert according to claim 1, wherein the at least one major edge comprises a major cutting edge.

3. The cutting insert according to claim 2, wherein the major cutting edge extends along substantially the whole length of an associated major side surface.

4. The cutting insert according to claim 2, wherein one of the sections of the at least one minor edge comprises a minor cutting edge.

5. The cutting insert according to claim 4, wherein the first raised corner connects the major cutting edge with the minor cutting edge.

6. The cutting insert according to claim 4, wherein each minor cutting edge extends along at least half of the length of an associated minor edge.

7. The cutting insert according to claim 4, wherein each end surface comprises a pair of diagonally opposing corner cutting edges, each associated with a raised corner, corresponding major and minor cutting edges merging at said corner cutting edges.

8. The cutting insert according to claim 7, wherein said at least one abutment surface is positioned between said diagonally opposing corner cutting edges.

9. The cutting insert according to claim 1, wherein each minor side surface merges with an adjacent major side surface at a corner side surface, wherein each corner side surface extends between a given raised corner of one of the two opposing end surfaces and a given lowered corner of the other of one of the two opposing end surfaces.

10. The cutting insert according to claim 1, wherein each end surface is provided with at least one abutment member upon which said at least one abutment surface is provided.

11. The cutting insert according to claim 1, wherein in an end-view of the cutting insert the at least one abutment surface is generally rectangular in shape.

12. The cutting insert according to claim 1, wherein at least a portion of the abutment surface is flat.

13. The cutting insert according to claim 1, wherein:

the two identical opposing end surfaces have 180° rotational symmetry about a first axis A1 passing therethrough, the two identical opposing major side surfaces have 180° rotational symmetry about a second axis A2 passing therethrough, the second axis A2 being perpendicular to the first axis A1, and a minor plane P1 is defined by the first axis A1 and the second axis A2;

the two identical opposing minor side surfaces have 180° rotational symmetry about a third axis A3 passing therethrough, the third axis A3 being perpendicular to the first axis A1 and the second axis A2, and a major plane P2 is defined by the first axis A1 and the third axis A3; and the median plane M is defined by the second axis A2 and the third axis A3.

14. A milling cutter comprising:

a plurality of insert receiving pockets; and a cutting insert in accordance with claim 1 seated in each of said pockets.

* * * * *